United States Patent Office 2,862,937
Patented Dec. 2, 1958

2,862,937

HYDROCORTISONE AND CORTISONE 21-(2-CHLORO-4-NITROBENZOATES)

Melvin A. Rebenstorf, Kalamazoo Township, Kalamazoo County, Mich., assignor to The Upjohn Company, Kalamazoo, Mich., a corporation of Michigan No Drawing. Application May 10, 1956
Serial No. 583,909

3 Claims. (Cl. 260—397.45)

This invention is concerned with physiologically active steroid hormones and is more particularly concerned with 11β,17α,21-trihydroxy-4-pregnene-3,20-dione and 17α,21-dihydroxy-4-pregnene-3,11,20-trione 21-(2-chloro-4-nitrobenzoates), i. e. the hydrocortisone and cortisone 21-(2-chloro-4-nitrobenzoates) represented by the following formula:

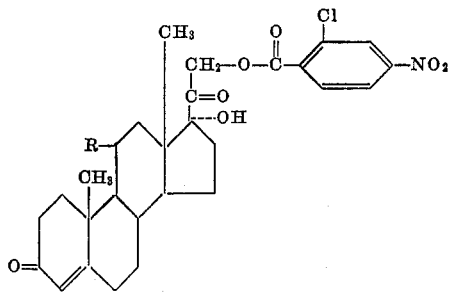

wherein R is selected from the group consisting of β-hydroxy and oxo.

It is an object of the present invention to provide the 21-(2-chloro-4-nitrobenzoate) of hydrocortisone and cortisone which are physiologically active agents of high potency having high anti-inflammatory activity, particularly locally and intra-articularly, anti-arthritic activity, low toxicity, and a superior therapeutic ratio. The compounds of the present invention are substitutable for other adrenal cortical steroid hormones in known adrenal cortical steroid hormone-containing pharmaceutical compositions such as tablets, lotions, ointments, injectables, and elixirs. Other objects and uses of the present invention will be apparent to one skilled in the art.

The 21-(2-chloro-4-nitrobenzoate) of hydrocortisone and cortisone of the present invention are obtained by esterification of hydrocortisone and cortisone, respectively, to introduce the 21-(2-chloro-4-nitrobenzoate) radical, as more fully described in the following illustrative examples.

EXAMPLE 1

A solution of 543 grams of hydrocortisone in 5.5 liters of pyridine is prepared at forty degrees centigrade and cooled to about twenty-five degrees centigrade. Then 396 grams of purified ortho-chloro-para-nitrobenzoyl chloride is added, with stirring, at such a rate the reaction temperature remains between twenty and thirty degrees centigrade, and stirring is continued for an additional four hours. The resulting reaction mixture is poured into about seven gallons of ice and water, with stirring, causing the product to precipitate as a fine solid. After standing over-night at five degrees centigrade the product is removed by filtration, washed with one gallon of water, then washed again with five gallons of water, and sucked dry on the filter. The filter cake is dissolved in a hot mixture of thirteen gallons of ethyl acetate and five gallons of acetone, the solution filtered through Celite diatomaceous earth, the filtered solution concentrated to about a five-gallon volume and cooled slowly to five degrees centigrade, and stored overnight at this temperature. The solid product is separated by filtration, washed with a small amount of ethyl acetate and dried overnight in a vacuum oven at sixty degrees centigrade; yield 520 grams or 64.5 percent of the theoretical amount; melting point 217 to 220 degrees centigrade. Recrystallization of the product from a mixture of four gallons of ethyl acetate and nine gallons of acetone, using 65 grams of Nuchar C-190 N decolorizing charcoal, provides 430 grams, 53 percent of the theoretical amount, of hydrocortisone 21-(2-chloro-4-nitrobenzoate); melting point 232 to 235 degrees centigrade; $[\alpha]_D^{24}$ is plus 156 to 159 degrees in dioxane.

*Analysis.*—Theoretical: C, 61.58; H, 5.90. Found: C, 61.46; H, 6.06.

EXAMPLE 2

A solution of one part of cortisone in ten parts of pyridine is prepared at about forty degrees centigrade, two parts of ortho-chloro-para-nitrobenzoyl chloride (which need not be highly purified) is added, with stirring, at such a rate that the reaction temperature remains at twenty to thirty degrees centigrade, and stirring is continued for an additional four hours. The resulting solution is poured, with stirring, into 45 parts of ice and water mixture causing precipitation of the product. After the aqueous mixture has stood overnight at about five degrees centigrade, the product is filtered, washed with water, dried under vacuum at sixty degrees centigrade, and recrystallized from hot ethyl acetate using Nuchar C-190 N decolorizing charcoal. The yield of purified cortisone 21-(2-chloro-4-nitrobenzoate) is 66 percent; melting point 222 to 224 degrees centigrade; $[\alpha]_D^{24}$ is plus 203 degrees in chloroform.

*Analysis.*—Theoretical: C, 61.82; H, 5.56. Found: C, 62.05; H, 5.88.

I claim:

1. A compound selected from the group consisting of 11β,17α-trihydroxy- 4 - pregnene - 3,20 - dione 21 - (2 - chloro-4-nitrobenzoate) and 17α,21-dihydroxy-4-pregnene-3,11,20-trione 21-(2-chloro-4-nitrobenzoate).

2. 11β,17α,21-trihydroxy-4-pregnene-3,20-dione 21-(2-chloro-4-nitrobenzoate).

3. 17α,21-dihydroxy-4-pregnene-3,11,20-trione 21-(2-chloro-4-nitrobenzoate).

References Cited in the file of this patent

UNITED STATES PATENTS 2,183,589   Reichstein _____ Dec. 19, 1939